April 8, 1969     L. B. CAMPBELL     3,437,070
TEMPERATURE INDICATOR
Filed Jan. 28, 1966

INVENTOR.
LLOYD B. CAMPBELL
BY
Gausewitz & Carr
ATTORNEYS.

United States Patent Office 3,437,070
Patented Apr. 8, 1969

3,437,070
TEMPERATURE INDICATOR
Lloyd B. Campbell, Los Angeles, Calif.
(835 Keeaumoku, Honolulu, Hawaii 96814)
Filed Jan. 28, 1966, Ser. No. 523,711
Int. Cl. G01d 21/00
U.S. Cl. 116—114                        7 Claims

ABSTRACT OF THE DISCLOSURE

A temperature-indicating device including two reactants combinable to produce a change in color, the reactants being separated by a barrier, which is frangible upon the freezing of one of the reactants to allow access of one reactant to the other, the barrier also being sensitive to elevated temperatures for allowing the reactants to combine upon reaching a predetermined temperature.

---

This invention pertains to an arrangement for indicating temperature and in particular to a device which will show when the environmental temperature has gone either above or below a predetermined temperature range.

As a temperature indicator that will show when temperatures have fallen outside an established range, the device of this invention is of particular value in monitoring the temperature exposure of perishable products with living cells. These products may be harmed if temperatures either fall below freezing or rise above a certain value. Consequently, it is important to know when such an event has occurred. The present invention gives a positive irreversible signal through an easily discernible color change to show when temperatures have been experienced outside the range.

The temperature-indicating device of this invention includes two reactants which are combinable to produce a change in color. Normally, the reactants are kept separated by a barrier arrangement that is sensitive to forces produced when one of the reactants freezes, to open communication between the reactants so that the reactants may combine to effect the color change. The barrier arrangement also will open communication between the reactants when an established elevated temperature is reached so that again a change in color can be observed. Hence, the device indicates both high and low limiting temperatures.

The device includes inner and outer transparent containers, the former of which is made of glass while the latter normally is plastic. The inner container holds an indicator solution, such as phenolphthalein to which a vegetable dye has been added. This inner container is sealed with wax of a predetermined melting point, outside of which is a material, such as a sodium hydroxide, capable of reacting with the solution in the inner container to change color. If the indicator assembly is subjected to a temperature above the melting point of the wax, it will no longer seal the inner container, thereby permitting the sodium hydroxide to enter the phenolphthalein solution. The result is an increase in pH and a change of color to bright red. On the other hand, if the temperature should fall below freezing, the inner glass container will fracture from the expansion of the solution it contains, again allowing the sodium hydroxide access to the phenolphthalein solution. As before, therefore, the color change will occur.

The indicating device of this invention may be used where the intent is merely to monitor one temperature rather than the high and low limits of a temperature range. It is useful, for example, as a thaw indicator for frozen foods. As long as the temperature is below freezing, the reaction between the phenolphthalein and sodium hydroxide is arrested, even though the inner glass container is broken, so that the color change will occur only when the surroundings have risen above the freezing point where the phenolphthalein solution thaws.

An object of this invention is to provide an improved arrangement for indicating temperatures.

Another object of this invention is to provide a temperature indicator for either end of a predetermined temperature range.

A further object of this invention is to provide a temperature indicator giving a positive irreversible signal to show the occurrence of the limiting condition.

Yet another object of this invention is to provide a temperature indicator which will show by a color change when frozen materials have exceeded the freezing point.

These and other objects will become apparent from the following detailed description taken in connection with the accompanying drawing in which.

Figure 1:
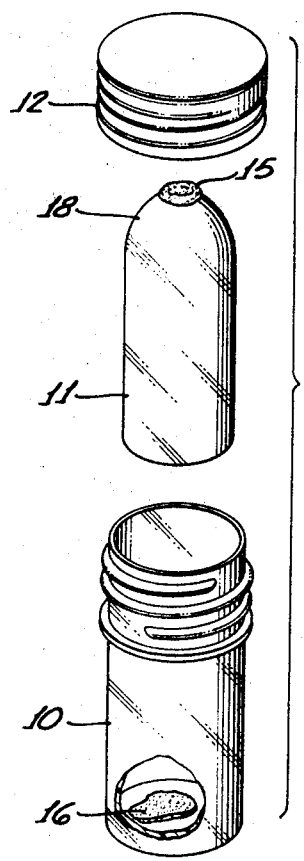
FIGURE 1 is an exploded perspective view of the components of the indicator of this invention.
Figure 2:
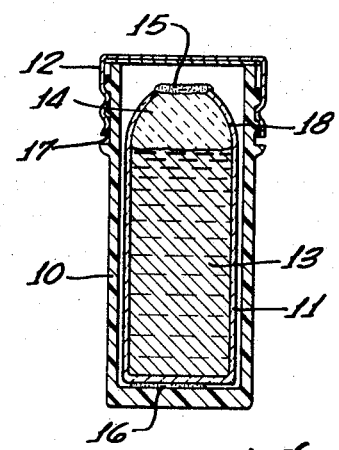
FIGURE 2 is a longitudinal sectional view of the indicator in its assembled relationship.

As illustrated in the drawing, the indicator of this invention includes a transparent outer plastic vial 10 receiving a glass ampule 11 and closed by a metal cap 12 that threads onto one end. The ampule 11 contains a liquid 13, which may be a phenolphthalein solution. This is prepared by dissolving phenolphthalein in distilled water in the ratio of approximately .01 gram of phenolphthalein to one pint of water. Preferably also, a small amount of green vegetable dye is added to the liquid 13 to give it a green color. Initially, the upper end of the ampule 11 is open, permitting the introduction of the liquid 13 into, it after which it is closed by a quantity of wax 14. This will be a wax of predetermined melting point. This should be selected as melting at the upper end of the range of temperatures which are to be detected. Typically, where the indicator is to be used in conjunction wtih living cells, the upper end of the permissible temperature range of the environment is 140° F. and the wax 14 will have that melting point. In sealing the ampule 11 with the wax 14, the ampule with its liquid content is heated to 180° F. The melted wax is poured into the top of the ampule above the liquid The bottle and wax then are cooled to room temperature.

Exteriorly of the sealed ampule 11 inside the outer plastic bottle 10 is a quantity of dilute sodium hydroxide. It is applied most readily when in paste form, with a small portion 15 placed on the wax plug 14. An additional small portion 16 of the sodium hydroxide may be applied to the inside of the plastic vial 10 at the bottom wall. Thus, as the indicator is assembled, the sodium hydroxide and phenolphthalein solution are kept separated and on opposite sides of the barrier provided by the glass container 11 and its wax closure 14.

The filled and sealed ampule 11 is introduced into the plastic bottle 10, which then is closed by threading on the cap 12. The ampule 11 occupies most of the volume of the vial 10, with a small clearance existing between the inner and outer container. Preferably, a small amount of epoxy resin 17 is applied to the threads before the cap is installed, sealing the inside of the plastic vial 10 and locking the cap in place so that it will not be removed.

Figure 3:
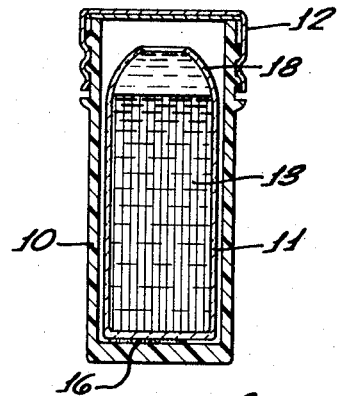
FIGURE 3 is a view similar to FIGURE 2, illustrating the occurrence of a temperature above the upper limit of the established temperature range.

In use of the temperature indicator, it may be kept with a shipment of living cells, such as pencilin, vitamins, whole blood or animal semen, to show whether any damaging temperatures are experienced before time of use. As long as the temperature stays within the range of 32° F. to 140° F., the indicator will show no change and will retain its green color. However, in the event the environment should exceed 140° F., the wax 14 will melt, as illustrated in FIGURE 3. As a consequence, there is access between the phenolphthalein solution 13 and the sodium hydroxide 15. Immediately the pH of the liquid changes from approximately 7.5 to 9.5. The result is an irreversible color change from green to bright red. It is instantly apparent from observing the indicating device, therefore, that the temperature has gone outside the established range as the brilliant red color appears through the transparent vial 10. The addition of the green dye to the phenolphthalein solution results in a red hue to the liquid after the reaction has taken place which is deeper and more vivid than ordinarily observed upon the reaction of phenolphthalein and sodium hydroxide.

Figure 4:
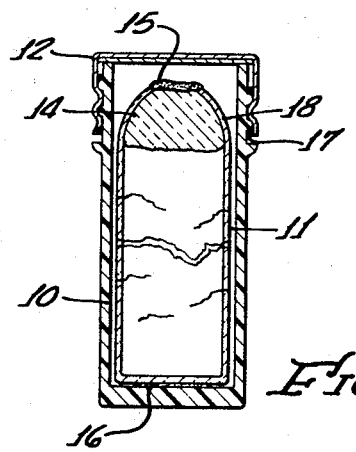
FIGURE 4 is a view similar to FIGURE 2, showing the breakage of the inner container upon reduction below the freezing point.

If, instead of rising in temperature, the surroundings should drop to below the freezing point, the ampule 11, being made of thin glass, immediately will crack, so that again there is access between the sodium hydroxide and the phenolphthalein. This breakage of the inner glass container is seen in FIGURE 4. The freezing of the liquid 13 within the bottle causes expansion of it, so that the glass is broken. The inwardly convergent upper end 18 of the glass ampule provides full assurance that, upon freezing, the liquid will expand against the walls of the ampule and will not merely force the wax out of the top end of the ampule. With the top end convergent, the wax cannot be extruded from the container, and breakage necessarily must take place.

When the contents of the temperature indicator are thawed subsequently, the sodium hydroxide and phenolphthalein again react to raise the pH and produce the color change. Consequently, the same bright red color shows through the outer plastic bottle 10 to indicate a temperature beyond the range on the low side as that which occurs when the upper limit has been exceeded. Therefore, the temperature indicator of this invention shows temperatures both above and below the established range.

It is not necessary to use the indicator for detecting temperatures at both ends of a range, because it is equally usable where the only concern is about one critical temperature limit. For example, it is important to be certain that frozen foods have not thawed during shipment or storage. The temperature indicator of this invention is ideally suited for showing whether or not the foods have risen above the freezing point. The indicator will be introduced into the cold compartment with the food, at which time it immediately freezes so that the ampule 11 is broken. However, the solidified phenolphthalein solution will not contact the sodium hydroxide so long as it remains in a frozen condition. Only if the melting point is reached will the sodium hydroxide and phenolphthalein make contact and react to produce the color change. Therefore, so long as the indicator shows only a green color, there is a certainty that the accompanying frozen food items have not become thawed. On the other hand, when the red color is observed, it is apparent that at some time 32° F. has been exceeded.

The temperatures are not limited to 32° F. and 140° F. as in the example given. Waxes of various melting points throughout a wide range may be selected for the closure 14, so that the upper limit can be established as desired. Also, the freezing point of the liquid within the ampule may be controlled through the addition of appropriate quantities of glycerin or alcohol to this solution. Therefore, the freezing point and hence the temperature at which the glass ampule 11 is broken may be shifted to values below 32° F. as circumstances dictate.

Phenolphthalein and sodium hydroxide are particularly suitable as the indicating constituents by virtue of the color change that is experienced as the pH is altered. However, other indications may be used also. For example, neutral red may be used with acetic acid or vinegar. Litmus also may be used with acetic acid or vinegar. Rosalic acid and dilute sodium hydroxide also will produce a color change. Another usable combination is Congo red and acetic acid with dilute sodium hydroxide.

With the arrangement described above, there is complete reliability and assurance that the reaction will take place to give the visible indication whenever the limiting temperatures have been passed. The ampule is a commercially available, relatively low cost container having a thin wall readily broken by internal forces as occur when the liquid freezes. Its shape also is suited to retain the wax plug at the top end, so that breakage necessarily will occur. On the other hand, the exterior plastic container 10 is not sensitive to the temperatures to which the unit is subjected, and will not become cracked or broken. There is nothing to expand outwardly against the wall of the exterior plastic container 10 and, of course, the plastic material is less brittle than glass. The temperature indicator, therefore, may be given rough handling without escape of the contents or reduction in the assurance of the color change upon passing the temperature limit.

The foregoing detailed description is to be clearly understood as given by way of illustration and example only, the spirit and scope of this invention being limited solely by the appended claims.

I claim:
1. A temperature-indicating device comprising
a first container,
said first container having transparent wall means,
a second inner container in said first container,
said second container having an opening therethrough,
a closure means over said opening,
said closure means being sensitive to temperatures above a first predetermined temperature and permitting access through said opening between the interior and exterior of said second inner container when said first predetermined temperature is exceeded,
a first reactant in said second inner container,
said first reactant being in liquid form,
said liquid being capable of solidifying upon reduction in temperature to a second predetermined temperature,
and expansible upon such solidification,
said second inner container including frangible means for being broken by said expansion of said liquid upon solidification thereof when reduced to said second predetermined temperature
for thereby providing access between the interior and exterior of said second inner container,
and a second reactant in said first container exteriorly of said second inner container,
said first and second reactants being combinable to provide a predetermined color,
whereby upon exceeding said first predetermined temperature of falling below said second predetermined temperature said reactants are permitted to combine to provide said predetermined color.
2. A temperature-indicating device comprising
a first container of transparent plastic,
said container having an opening therethrough,
a closure member over said opening,
a second container in said first container,
said second container having a transparent frangible glass wall,
a liquid in said second container, said liquid being freezable at a first predetermined temperature and expansible upon such freezing,
said second container having an opening therethrough,
a closure means over said opening,
said closure means being a substance that will melt when elevated to a second predetermined temperature higher than said first predetermined temperature for providing ingress and egress for said second container through said opening, said frangible glass wall of said second container being breakable upon freezing of said liquid therein with attendant expansion thereof upon reduction of said liquid below said first predetermined temperature,
a first reactant in said liquid,
and a second reactant exteriorly of said second container and within said first container,
said reactants being combinable to provide a change in color
and provided with access to each other for so combining upon said melting of said closure means and upon said breaking of said wall of said second container.

3. A device as recited in claim 2 in which said closure means is a wax having a predetermined melting point.

4. A device as recited in claim 2 in which
said second container is a glass ampule having a convergent portion adjacent and inwardly of said opening therethrough,
said closure means being interiorly of said second container and in engagement with said convergent portion,
whereby upon freezing of said liquid said convergent portion prevents extrusion of said closure means through said opening to assure said breaking of said second container.

5. A device as recited in claim 2 in which
said closure for said first container comprises a threaded metal cap,
said first container having threads receiving said threads of said cap,
and including a sealing material around said threads for sealing said second container and precluding inadvertent removal of said cap.

6. A device as recited in claim 2 in which said reactants when combined provide a change in pH, said reactants including an indicator to cause said color change upon said change in pH.

7. A device as recited in claim 2 in which said first reactant includes phenolphthalein, and said second reactant includes dilute sodium hydroxide.

References Cited

UNITED STATES PATENTS

| | | | |
|---|---|---|---|
| 2,662,018 | 12/1953 | Smith | 116—114.5 XR |
| 2,674,221 | 4/1954 | Tinslet | 116—114 |
| 2,856,885 | 10/1958 | Huyck et al. | 116—106 |
| 3,046,786 | 7/1962 | Tessem | 73—356 |
| 3,260,112 | 7/1966 | Godbey et al. | 73—356 |
| 3,090,236 | 5/1963 | Nicol | 73—358 |
| 3,177,843 | 4/1965 | Geocaris | 116—114.5 |
| 3,233,459 | 2/1966 | Gleason et al. | 73—358 |

LOUIS J. CAPOZI, *Primary Examiner.*

U.S. Cl. X.R.

73—358; 99—192